(No Model.)
J. D. BRUNTON & F. H. J. TRIER.
TURNING OR SHAPING STONE.
No. 252,727. Patented Jan. 24, 1882.
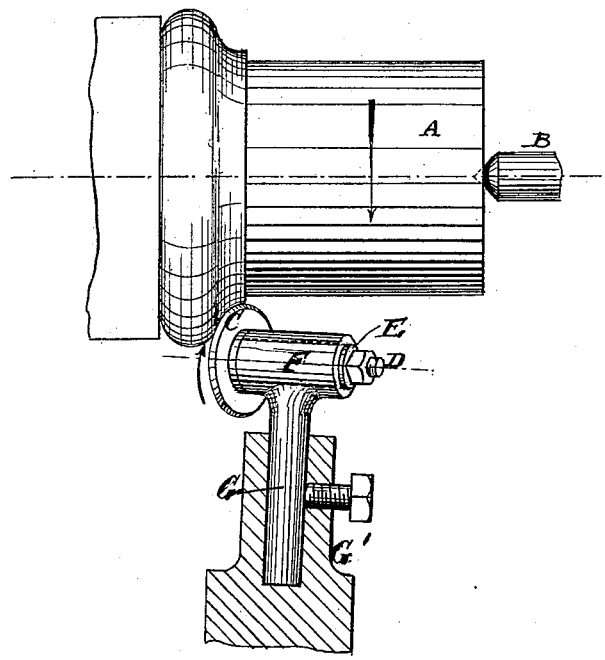
Witnesses:
Ed Frick
N. C. Lane.
Inventors:
J. D. Brunton and
F. H. J. Trier by
W Bailey
attorney

UNITED STATES PATENT OFFICE.

JOHN D. BRUNTON AND FRANK H. J. TRIER, OF WESTMINSTER, COUNTY OF MIDDLESEX, ENGLAND.

TURNING OR SHAPING STONE.

SPECIFICATION forming part of Letters Patent No. 252,727, dated January 24, 1882.

Application filed September 28, 1881. (No model.)

*To all whom it may concern:*

Be it known that we, JOHN DICKINSON BRUNTON and FRANK HENRY JULIUS TRIER, (commonly known as FRANK TRIER,) subjects of the Queen of Great Britain, and residing at 19 Great George Street, Westminster, in the county of Middlesex and Kingdom of England, have invented certain Improvements in Turning or Shaping Stone, of which the following is a specification.

Our said invention relates to improvements in turning or shaping stone; and it consists in an improved mode of applying a single cutter so as to cut or produce circular concave surfaces, as hereinafter described.

In the accompanying drawing, A represents the stone to be turned, which is supported on suitable lathe-centers B, one center only being shown in the drawing. A circular cutter, C, is fixed by means of the bolt D to a hollow spindle, E, which is supported so as to be free to revolve in the holder F, which is provided with a cylindrical stem or support, G, working in a socket, G', in such a manner as to enable the holder F and cutter C to be turned bodily upon the said stem or support. The object of this arrangement is to enable the cutter to be readily placed at such an angle to the stone as shall produce the concave surface desired. The socket G' in which the stem G works, and which forms part of an ordinary slide-rest, is also capable of traveling in any required direction in order to enable the cutter to be fed forward in the usual manner and be brought to work on any part of the stone. The stone A revolves in the direction of the arrow marked thereon in the drawing, and the cutter C is thereby caused to revolve in the opposite direction, as indicated by another arrow.

The round or cylindrical stem G of the cutter-holder F being capable of rotating in its supporting-socket G', as hereinbefore described, enables the cutter to be adjusted in such a manner as to cause the edge of the said cutter to be presented to the stone at the most favorable angle for producing the required concave surface, as shown in the drawing.

The arrangement of the cutter holder or support hereinbefore described is also applicable to cutting or shaping stone in other than turning operations—such, for example, as forming straight or curved moldings; but this arrangement will form the subject of another application for Letters Patent.

We claim as our invention—

In machinery for turning stone, the combination, with a holder or a slide-rest, of a circular cutter free to revolve, and arranged with its cutting edge at such an angle to the revolving stone as to cut or produce concave surfaces, substantially as hereinbefore described and illustrated.

In testimony whereof we have signed our names to this specification in the presence of two subscribing witnesses.

JOHN DICKINSON BRUNTON.
FRANK HENRY JULIUS TRIER.

Witnesses to the signature of John Dickinson Brunton:
 CHAS. MILLS,
 JOHN JAMES,
 *Both of 47 Lincoln's Inn Fields, London.*

Witnesses to the signature of Frank Henry Julius Trier, (commonly known as Frank Trier:)
 F. ENGLERT,
 FRANZ MÜLLER,
  *Both of Mannheim.*